United States Patent [19]

Endres et al.

[11] Patent Number: 5,632,244
[45] Date of Patent: May 27, 1997

[54] SPARK-IGNITION PISTON ENGINE WITH FACILITIES FOR CHANGING THE INLET DIRECTION OF THE FUEL-AIR MIXTURE

[75] Inventors: Helmut Endres, Herzogenrath; Heinz-Jakob Neusser, Aachen; Rainer Wurms, Bonn, all of Germany

[73] Assignee: FEV Motorentechnik GmbH & Co. Kommanditgesellschaft, Aachen, Germany

[21] Appl. No.: 507,248

[22] PCT Filed: Dec. 17, 1994

[86] PCT No.: PCT/EP94/04202

§ 371 Date: Nov. 9, 1995

§ 102(e) Date: Nov. 9, 1995

[87] PCT Pub. No.: WO95/17589

PCT Pub. Date: Jun. 29, 1995

[30] Foreign Application Priority Data

Dec. 20, 1993 [DE] Germany ............... 9319545 U

[51] Int. Cl.⁶ .................................................. F02B 31/00
[52] U.S. Cl. ........................................ 123/306; 123/184.45
[58] Field of Search ................... 123/184.37, 184.45, 123/188.14, 306, 308, 432

[56] References Cited

U.S. PATENT DOCUMENTS

| | | | |
|---|---|---|---|
| 4,347,816 | 9/1982 | Saito et al. | 123/432 X |
| 4,381,738 | 5/1983 | Shaffer | 123/432 X |
| 4,543,931 | 10/1985 | Hitomi et al. | 123/308 |
| 4,641,620 | 2/1987 | Yoshimura et al. | 123/432 |
| 5,186,139 | 2/1993 | Matsura | 123/306 X |

FOREIGN PATENT DOCUMENTS

| | | |
|---|---|---|
| 0094002 | 11/1983 | European Pat. Off. . |
| 1472204 | 5/1967 | France . |
| 2035939 | 2/1972 | Germany . |
| 2921300 | 12/1979 | Germany . |
| 3701674 | 7/1987 | Germany ............... 123/308 |
| 4313849 | 10/1993 | Germany . |
| 55-35177 | 3/1980 | Japan . |
| 59-120718 | 7/1984 | Japan . |
| 61-175233 | 8/1986 | Japan . |
| 62-32222 | 2/1987 | Japan . |
| 5-209582 | 8/1993 | Japan . |
| 6-58153 | 3/1994 | Japan . |
| 2087476 | 5/1982 | United Kingdom . |
| WO91/14858 | 10/1991 | WIPO . |

Primary Examiner—Tony M. Argenbright
Attorney, Agent, or Firm—Spencer & Frank

[57] ABSTRACT

A spark-ignition reciprocating piston engine has at least one piston cylinder, at least one inlet port arranged at an end of the cylinder, an inlet valve located at the inlet port and that is movable to open and close the inlet port, and an inlet conduit leading to the inlet port for feeding a fluid from a fuel feed to an inlet area of the inlet port. The engine includes a partition arranged within the inlet conduit which divides the inlet conduit into at least two partial conduits over at least a portion of a length of the inlet conduit between the fuel feed and the inlet area. At least one of the partial conduits is connected to the fuel feed. The partial conduits converge directly in front of the inlet port to form the inlet area. The partition is located within a plane that extends essentially transversely to an axis of the cylinder at least in the inlet area. The partition has an end edge facing the inlet area, and has at least one portion that is movable to deflect a flow of the fluid on blow-by from the inlet conduit, through the inlet port, and into the cylinder. A controllable actuation arrangement is connected to the portion for changing a distance from the end edge to the inlet port.

10 Claims, 3 Drawing Sheets

SPARK-IGNITION PISTON ENGINE WITH FACILITIES FOR CHANGING THE INLET DIRECTION OF THE FUEL-AIR MIXTURE

BACKGROUND OF THE INVENTION

The invention relates to a reciprocating piston engine with an externally supplied ignition, i.e., spark ignition, and at least one inlet port per cylinder, each of which can be closed and opened by an inlet valve, which is associated with a conduit-shaped inlet for air and/or a fuel-air mixture and which is connected with means which enable a controllable deflection of flow at the transition from the inlet through the inlet port into the cylinder.

WO 91/14858 discloses an engine of the above-described type. The means for deflecting the flow in the prior device are comprised of slides, butterfly valves, swivel nozzles, or the like, which are disposed in the conduit-shaped inlet, immediately upstream of the inlet port. These elements are actuated via corresponding actuation means, depending upon the operational state of the engine, in order in certain operational states to deflect the fuel-air mixture, always referred to below as gas flow, which is flowing through the conduit-shaped inlet, so that during the intake stroke, inside the cylinder space, a rolling vortex is formed, whose rotational axis runs perpendicular to the cylinder axis. The disadvantage of this apparatus is comprised in that the actuation means are disposed and supported in the inlet directly upstream of the inlet port, that is, in a region in which there is only a small amount of space available for additional elements.

The object of the invention now is to improve a reciprocating piston engine of the kind described at the beginning with regard to the deflection possibilities of the gas flow upon entry into the cylinder.

This object is attained according to the invention by the fact that the inlet has at least a first and a second partial conduit, which join together to form an inlet region immediately upstream of the inlet port. The dividing plane is aligned essentially perpendicular to the axis of the cylinder, that at least the first partial conduit is connected to the fuel supply, and that means are associated with at least the second partial conduit, which are for changing its free flow cross section. This apparatus has the advantage that the flow through at least one of the partial conduits is purposefully supplied to a section of the valve gap region and the distribution over the valve gap of the charge mass flowing into the cylinder can be changed by throttling at least one of the partial flows. Since the distribution of the charge mass over the valve gap has a determining influence on the development of a vortex in the cylinder, in the end the vortex development and vortex intensity in the cylinder can be controlled by the throttling of at least one of the partial conduits. At the same time, there is the possibility of influencing the degree to which the various ingredients in the charge mix. The mass distribution onto the upper and lower valve gap region is influenced by means of this. At a greater percentage by mass, a rolling vortex (tumbling) is formed in the cylinder of the engine by means of the upper valve gap region, which vortex can favorably influence combustion and, if desired, makes possible a stable layering between air, fuel, and/or exhaust. The vortex development when the lower partial conduit is closed furthermore leads to a favorable combustion behavior at low engine loads (partial load). At full load, no intense vortices should be produced, i.e., both partial conduits should be open. The particular advantage of this device is comprised primarily in that the means for changing the free flow cross section do not have to be disposed directly upstream of the inlet port, but with a certain spacing from it so that greater embodiment possibilities in construction are available here.

A further advantage of the invention is comprised in that the necessary built-in parts in the inlet conduit reduce the free flow cross section only slightly so that only slight additional flow losses occur. Already for structural reasons, the preferably upper first partial conduit is connected to the fuel supply, for example in the manner that a fuel injection nozzle discharges into this conduit. Depending on the operational state, at this point, when the second partial conduit is closed or only slightly open, the fuel-air mixture flows through the upper, first partial conduit and is principally supplied to the upper valve gap region. To the extent to which the supply of air or also of exhaust is increased via the second partial conduit disposed beneath it, the charge mass supplied to the lower valve gap region is also increased, so that the vortex development in the cylinder is reduced in accordance with the increase of the gas flow through the second partial conduit. The end edge of the dividing plane can be guided in until it seals against the shaft of the inlet valve or otherwise guided in so that the flow through the first (upper) partial conduit is conducted directly into the upper region of the valve gap. By means of this, a powerful rolling vortex is produced in the cylinder itself. The intensity of the rolling vortex can be varied in infinitely graduated fashion by controlling the distribution of the aspirated charge mass onto both of the partial conduits.

The mixing of the fuel-air mixture, or the mixture of exhaust, fuel, and air, can be influenced depending upon the structural embodiment of the conduit division and/or the choice of the time of fuel supply (injection time). In this case, both an intense mixing (homogeneous mixture) and an intense layering of the mixtures can be achieved. The invention furthermore permits the introduction of exhaust into at least one partial conduit and the achievement of a more or less intense layering of the exhaust-fuel-air mixture, depending upon the structural embodiment or the throttling of the partial conduits.

With the disposition of a plurality of inlet valves per cylinder, the invention furthermore, as one alternative, makes it possible to provide a common inlet for all inlet valves, in such a way that for all inlet valves, there is a common inlet region, in which the dividing plane ends. In the same manner, however, it is also possible to provide each inlet valve with an individual inlet, which is divided into two partial conduits.

While it is fundamentally possible to route the partial conduits as individual conduits that do not join together until the inlet region, a preferred embodiment of the invention provides that the inlet is embodied by an inlet conduit which is divided into two partial conduits by means of a dividing wall, at least over a partial length between the fuel supply and the inlet region. An inlet of this kind can already be cast integrally when the cylinder head is manufactured. The dividing wall can be comprised of the casting material of the cylinder head or of a component of another material, which is correspondingly inserted into the casting form and which is securely cast integrally with the cylinder head.

While the change of the flow direction of the gas flow that is flowing into the cylinder can be achieved via a change of the volumetric flow through the second flow conduit, specifically by providing that the conduit cross section is more or less unblocked via corresponding actuation means, in another embodiment of the invention it is possible for the dividing wall to be movably disposed in the inlet conduit—preferably longitudinally movable—and to be connected to a controllable actuation means so that the spacing of its end edge to the inlet port in the inlet region can be changed. As a result, when there is a central influence of the volumetric flow for the inlet conduit upstream of the dividing wall, which can also extend over only a partial length of the inlet conduit, the possibility arises of allowing the deflecting action of the downward directed curvature of the conduit wall to be more or less intensely effective, specifically because the gas flow through the second partial conduit loses the guiding influence of the dividing wall a short or long distance away from the inlet port. In lieu of a longitudinal movement of the dividing wall, which leads to a change of the flow guiding influence of the dividing wall, in particular of the influence of the end edge in the inlet region, in another embodiment of the invention it is possible to dispose the dividing wall in the inlet conduit, so that it can move perpendicular to the dividing plane, and to connect it with correspondingly controllable actuation means. With this device, the influence of the influx direction is likewise carried out by a change of the quantitative proportions of the volumetric flows, which are flowing through the first and the second conduits. If the volumetric flow through the second conduit is increased because the dividing wall is moved perpendicular to its face toward the wall of the first partial conduit and hence the flow cross section of this first partial conduit is reduced, an influx of gas flow into the cylinder is likewise produced, which takes place predominantly in the direction of the inlet conduit, and thereby a corresponding vortex development is generated.

Using the fact that the end edge of the dividing wall in the inlet region is exposed to an increased temperature influence, in another embodiment of the invention, it is provided that a bimetallic vane is disposed in the region of the end edge which is oriented toward the inlet port; the vane closes the flow cross section of the second partial conduit at least partially when the engine is cold and unblocks it as the heat increases. This device has the advantage that the means for changing the flow cross section are also the actuation means, in the form of the bimetallic vane.

In a further advantageous embodiment of the invention, it is provided that the dividing wall can be heated, in particular in a reciprocal piston engine with fuel injection. Since for structural reasons if no other, the unit injector for the fuel cannot be made in the flow direction in the partial conduit, but is made aligned at a certain angle, the disposition of a dividing wall which can be heated, offers the advantage that fuel droplets landing on the dividing wall are vaporized and consequently the mixture formation is improved.

BRIEF DESCRIPTION OF THE DRAWINGS

The invention is explained from schematic drawings of exemplary embodiments.

DETAILED DESCRIPTION OF THE INVENTION

Figure 1:
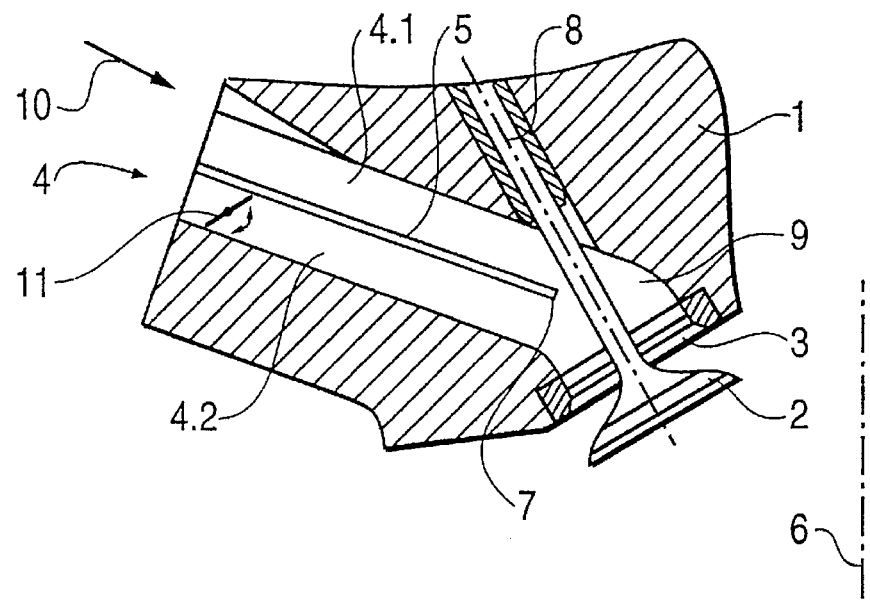
FIG. 1 shows a fragmentary vertical section of the cylinder head region of an inlet valve.

FIG. 1 shows a fragmentary section of a cylinder head 1 of a reciprocal piston engine. In the exemplary embodiments described below, the reciprocal piston engine is provided with one inlet valve 2 for each cylinder, which valve opens and closes the one inlet port 3. The inlet port 3 is affiliated with an inlet conduit 4, which in the exemplary embodiment shown is divided into a first partial conduit 4.1 and a second partial conduit 4.2 by a dividing wall 5. In this case, the dividing wall (partition) 5 extends with its dividing plane perpendicular to the axis 6 of the cylinder and ends with its end edge 7 directly upstream of the shaft 8 of the inlet valve 2. It can also either extend beyond the inlet valve, or end markedly upstream of it. The inlet conduit 4, which extends with its dividing wall 5 at an angle to the cylinder axis 6, ends in an inlet region 9, which is embodied essentially by a curved region, which is directed downward into the cylinder and is defined by the inlet port 3. In principle, the device can also be used when there are a plurality of inlet valves per cylinder. For example, the unit injector, which is not shown here, but only indicated by the arrow 10, feeds into the first partial conduit 4.1 so that a fuel-air mixture is conducted into the cylinder through partial conduit 4.1. Partial conduit 4.2 is acted upon by air, an exhaust-air mixture, a fuel-air mixture, an exhaust-fuel-air mixture, or recirculated exhaust so that the mixing of the fuel-air mixture of partial conduit 4.1 and the air, exhaust-air mixture, fuel-air mixture, exhaust-fuel-air mixture, or exhaust from partial conduit 4.2 can be carried out as early as possible after they flow together in the inlet region 9.

Figure 2:
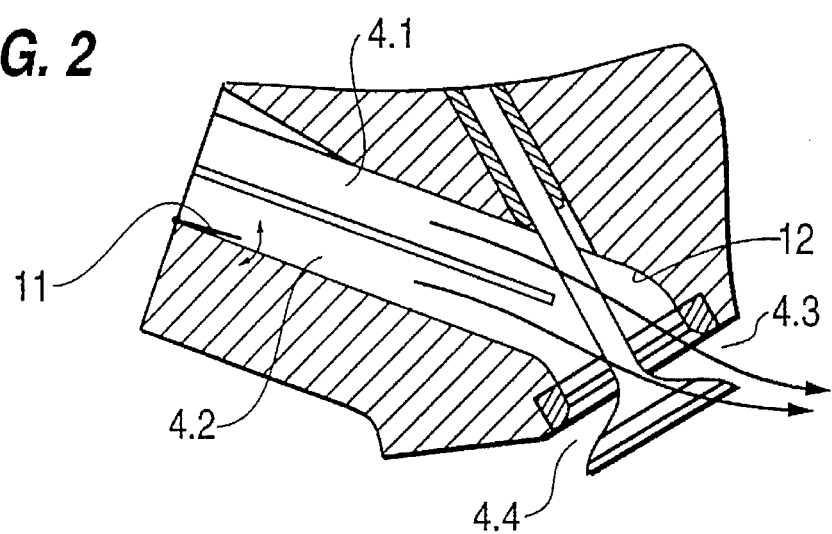
FIGS. 2 and 3 show modifications of the embodiment according to FIG. 1, FIGS. 4 and 5 show an embodiment with a movable dividing wall.
Figure 3:
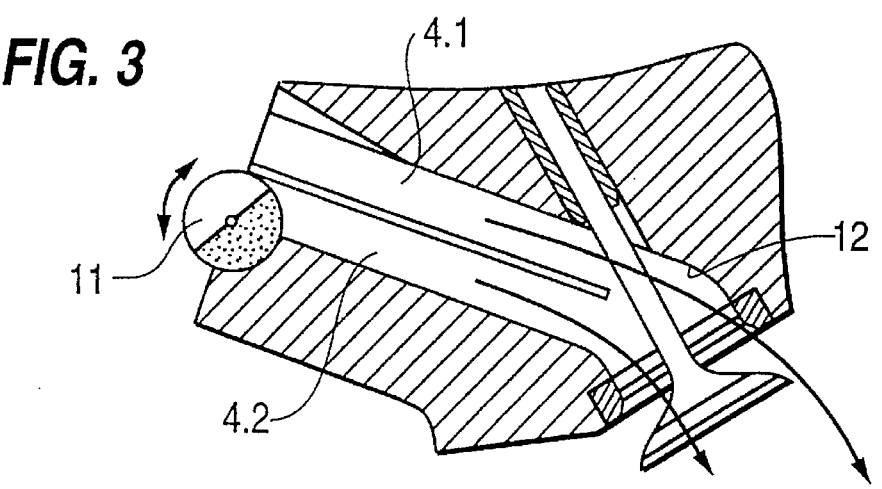

The partial conduit 4.2 is provided with a means 11 for changing the free flow cross section, e.g. a throttle valve, which is triggered depending upon the load state of the engine. FIGS. 2 and 3 show further embodiments of throttle devices 11 of this kind, for example in the form of a simple swivel valve (FIG. 2) or in the form of a rotating valve (FIG. 3).

The different flow directions of the gas flow, which is guided through the inlet 4, are now shown from FIGS. 2 and 3 for different opening positions of the throttling means 11. The mass distribution onto the upper 4.3 and lower 4.4 valve gap regions is influenced by the different positions of the throttling means 11. When there is a greater percentage by mass passing through the upper valve gap region, a rolling vortex (tumbling) is formed in the cylinder of the engine, which vortex can favorably influence the combustion and makes possible, if desired, a stable layering between air, fuel, and/or exhaust. The vortex development when the lower partial conduit is closed furthermore leads to a favorable combustion behavior at low engine loads (partial load). At full load, no intense vortices should be produced, i.e., both partial conduits should be open.

As FIG. 3 shows, if the volumetric flow through partial conduit 4.2 is now reduced via the throttling means 11 in comparison to the volumetric flow through partial conduit 4.1, then a greater percentage by mass of the overall mass is conducted through the upper valve gap region 4.3 into the cylinder than through the lower valve gap region 4.4. The intensity of the cylindrical vortex formed in the cylinder is controlled via the distribution of the charge mass onto the valve gap regions.

Figure 4:
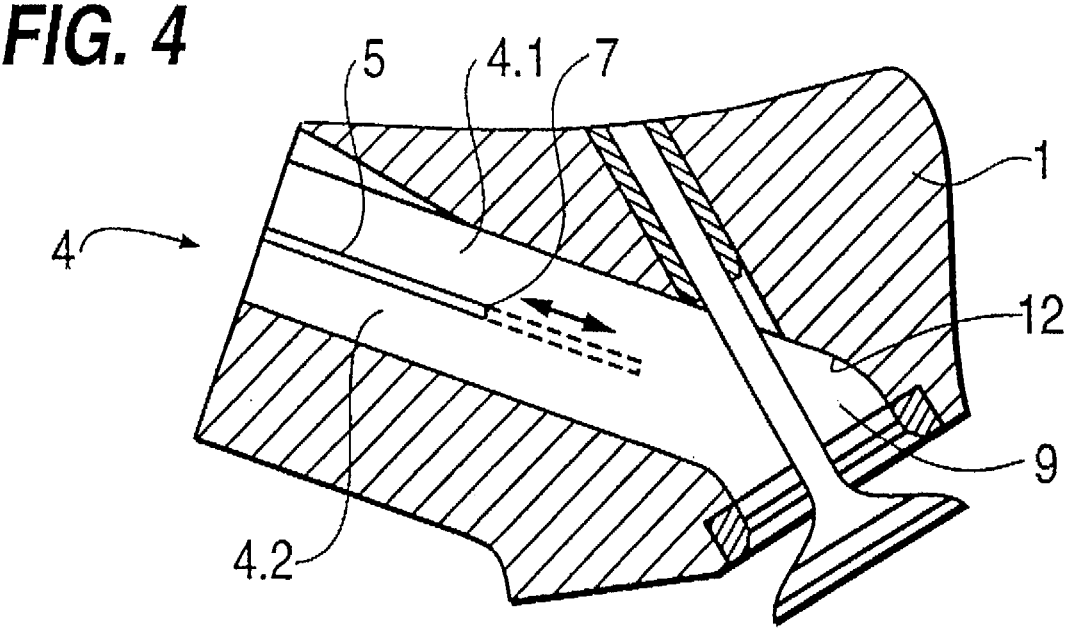

The embodiment according to FIG. 4 corresponds in its basic design to the embodiment according to FIG. 1. The difference here is comprised only in that the dividing wall 5 is guided in the inlet conduit 4 so that it can move in the longitudinal direction and can be moved via correspondingly controllable actuation means, or is installed fixed so that it already ends clearly upstream of the valve shaft, the farther the leading edge 7 of the dividing wall 5 is retracted from the inlet port 3, even if equal volumetric flows flow through both partial conduits 4.1 and 4.2, respectively.

It can easily be seen that the oncoming flow aimed at the valve regions via the partial conduits 4.1 and 4.2 is reduced and a greater "mixing distance" is produced.

Figure 5:
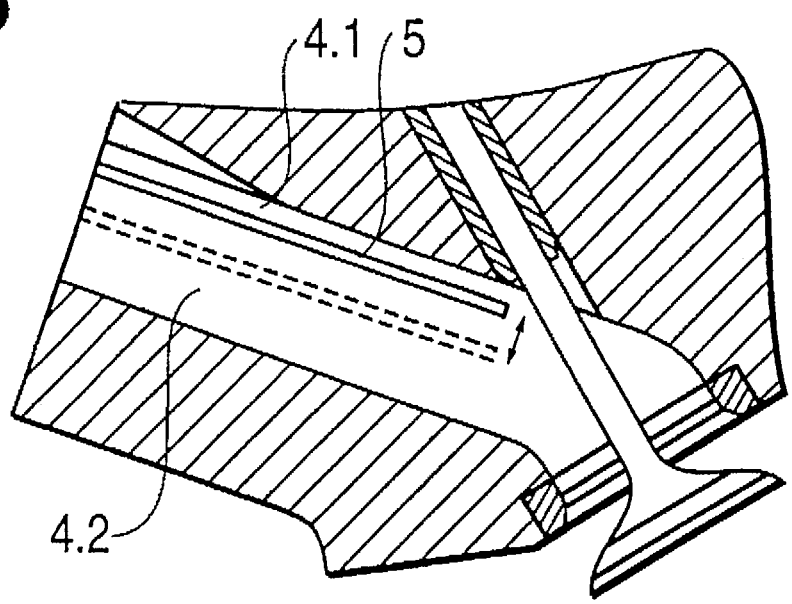

FIG. 5 shows a modification of the device according to FIG. 4. While the design is otherwise the same, in this device, the dividing wall 5 is disposed so that it can move perpendicularly in the inlet conduit 4 or is installed fixed outside the middle of the conduit so that the free flow cross section of partial conduit 4.1 can be reduced, while at the same time increasing the free flow cross section of partial conduit 4.2. The targeted oncoming flow at the upper valve gap region 4.3 can also become more or less intensely effective as a result of this changing of the overall flow.

Figure 6:
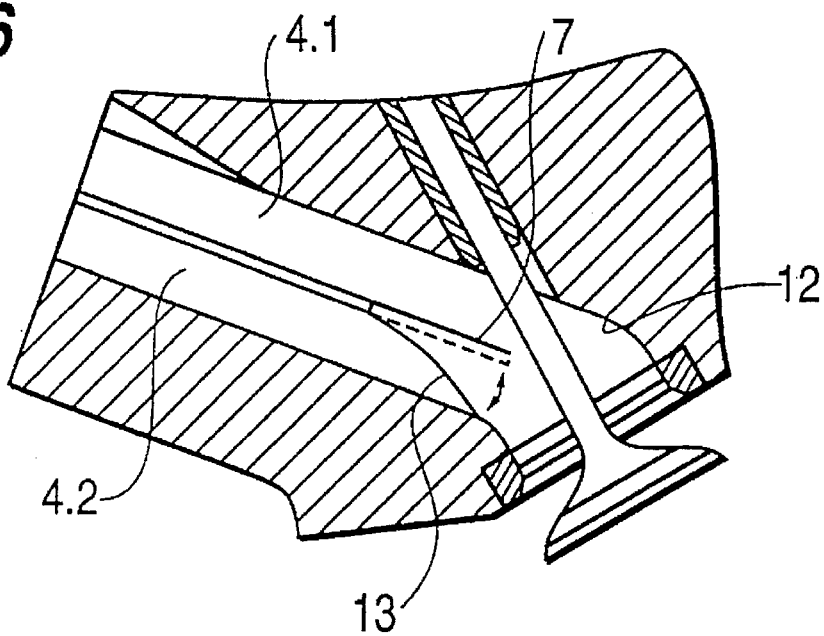
FIG. 6 shows an embodiment with a bimetallic vane as a throttle element.

In the embodiment shown in FIG. 6, the dividing wall 5, which is disposed fixed in the inlet conduit 4, in the region of its end edge 7 is then associated with a bimetallic vane 13, which more or less unblocks the free flow cross section of partial conduit 4.2, depending upon the prevailing temperature situation in the engine, which for its part depends upon the load state. Upon opening, for the time being, the bimetallic vane 13 still initially reinforces the uneven distribution of the aspirated charge masses onto the partial conduits 4.1 and 4.2 so that here, the directionally-designated influence of the partial gas flow or of partial conduit 4.2 becomes effective only after complete unblocking of the flow cross section. The device can also be disposed so that instead of a bimetallic vane, which completely covers the free flow cross section of partial conduit 4.2, also only a bimetallic vane can be provided, whose width is less than the width of partial conduit 4.2 so that in the closed position shown in FIG. 6, the flow cross section of partial conduit 4.2 is not completely closed. In lieu of only one bimetallic vane, which partially closes the partial conduit, two or a plurality of this kind of bimetallic vane can also be provided so that by means of partial conduit 4.2, when the outlet is closed or only partially open, the gas flow can flow out from partial conduit 4.2 in the form of "strands" into the cylinder chamber and thus an improvement of the mixture can be achieved.

When partial conduit 4.1 is associated with a unit injector whose spray direction for structural reasons must already be aligned at an angle to the axis of the inlet conduit 4, as is shown in FIG. 1 by arrow 10, a portion of the fuel droplets, in particular larger fuel droplets, land directly on the dividing wall 5. This circumstance, which intrinsically would be thought to be disadvantageous, can be used to improve the mixture formation, particularly in a cold engine, by embodying the dividing wall 5 so that it can be heated and thus intensifies the vaporization of fuel. This heating can be produced for example via the association of electrical resistance heating elements, so that in this case, the vaporization of the fuel droplets which land is further accelerated and the mixture formation is improved.

Figure 7:
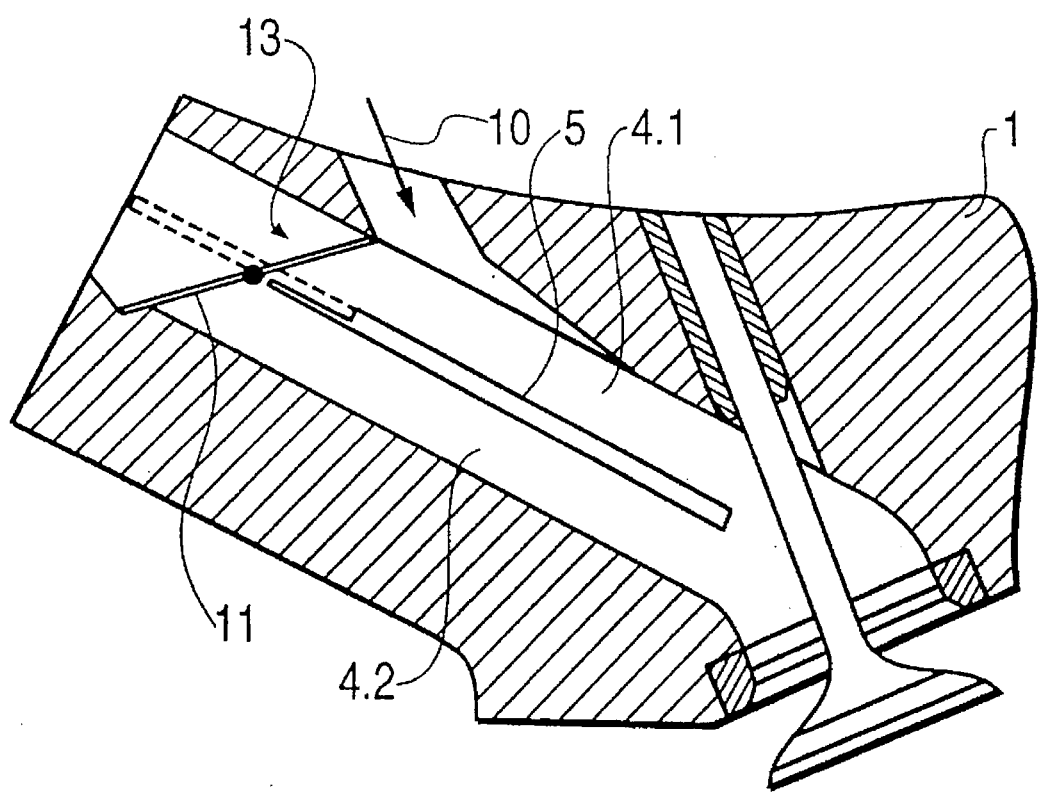
FIG. 7 shows an embodiment with a turbulence-producing assembly.

FIG. 7 shows an embodiment in which the means 11 for changing the free flow cross section of partial conduit 4.2 is embodied, on the dividing wall 5, in the form of a throttle valve. This throttle valve has an extension 13, which reaches into the cross section region of partial conduit 4.1 and has for example a grid-shaped structure and hence generates turbulence in the flow of gas flowing through the partial conduit 4.1 if the throttle valve 11 partially or completely closes partial conduit 4.2. The flow and mixing proportions, particularly in partial-load operation, are improved by the purposeful generation of a high degree of turbulence. The grid structure can be formed by a multitude of holes, preferably by means of a wire grid with corresponding mesh width, since the cross section reduction can be maintained by using thinner wires.

We claim:

1. A spark-ignition reciprocating piston engine having at least one piston cylinder, at least one inlet port arranged at an end of the cylinder, an inlet valve located at the inlet port and being movable to open and close the inlet port, and an inlet conduit leading to the inlet port for feeding a fluid from a fuel feed to an inlet area of the inlet port, said engine comprising:

a partition arranged within the inlet conduit and dividing the inlet conduit into at least two partial conduits over at least a portion of a length of the inlet conduit between the fuel feed and the inlet area, with at least one of the partial conduits being connected to the fuel feed, said partial conduits converging directly in front of the inlet port to form the inlet area, said partition being located within a plane that extends essentially transversely to an axis of the cylinder at least in the inlet area, and having an end edge facing the inlet area, said partition further having at least one deflecting portion that is movable to deflect a flow of the fluid on blow-by from the inlet conduit, through the inlet port, and into the cylinder; and controllable actuation means connected to said partition for changing a distance from the end edge to the inlet port.

2. The engine defined in claim 1, wherein the fluid comprises at least one of air and an air-fuel mixture.

3. The engine defined in claim 1, wherein said partition is movable in a longitudinal direction of the inlet conduit.

4. The engine defined in claim 1, wherein said partition is movable in a direction perpendicular to a wall surface of the inlet conduit.

5. The engine defined in claim 1, wherein said deflecting portion is located in a region of the end edge, said deflecting portion comprising at least one bimetallic vane that is movable to change a cross-sectional area of a selected one of said partial conduits, said bimetallic vane at least partially closing said selected one partial conduit when the engine is cold and opening said selected partial conduit as the engine heats.

6. The engine defined in claim 1, wherein said partition is heatable.

7. The engine defined in claim 6, wherein said engine is fuel injected.

8. The engine defined in claim 1, wherein at least one of said partial conduits is connectable to an exhaust gas recirculation.

9. The engine defined in claim 1, further comprising generating means disposed in at least one of said partial conduits for generating turbulence.

10. The engine defined in claim 9, wherein said generating means is controllable.

* * * * *